(12) United States Patent
Luo et al.

(10) Patent No.: US 11,067,972 B2
(45) Date of Patent: Jul. 20, 2021

(54) OBSERVATION DEVICE, OBSERVATION METHOD, AND NON-TRANSITORY COMPUTER-READABLE MEDIUM STORING AN OBSERVATION PROGRAM

(71) Applicant: FANUC CORPORATION, Yamanashi (JP)

(72) Inventors: Wei Luo, Yamanashi (JP); Junichi Tezuka, Yamanashi (JP); Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 21 days.

(21) Appl. No.: 16/189,334

(22) Filed: Nov. 13, 2018

(65) Prior Publication Data

US 2019/0187673 A1    Jun. 20, 2019

(30) Foreign Application Priority Data

Dec. 14, 2017  (JP) .............................. JP2017-239947

(51) Int. Cl.
| | |
|---|---|
| *G05B 23/02* | (2006.01) |
| *G06K 15/02* | (2006.01) |
| *G05B 19/4063* | (2006.01) |

(52) U.S. Cl.
CPC ..... *G05B 23/0221* (2013.01); *G05B 19/4063* (2013.01); *G05B 23/0272* (2013.01); *G06K 15/02* (2013.01)

(58) Field of Classification Search
None
See application file for complete search history.

(56) References Cited

U.S. PATENT DOCUMENTS

| | | | | |
|---|---|---|---|---|
| 6,915,223 | B2 * | 7/2005 | Li | G01R 13/345 345/440.1 |
| 7,218,325 | B1 * | 5/2007 | Buck | G06Q 30/06 345/440 |

(Continued)

FOREIGN PATENT DOCUMENTS

| | | |
|---|---|---|
| CN | 106325209 A | 1/2017 |
| CN | 107272590 A | 10/2017 |

(Continued)

OTHER PUBLICATIONS

Notification of Reasons for Refusal dated Nov. 12, 2019 in corresponding Japanese Patent Application No. 2017-239947.

(Continued)

*Primary Examiner* — Lina M Cordero
(74) *Attorney, Agent, or Firm* — Wenderoth, Lind & Ponack, L.L.P.

(57) ABSTRACT

To provide an observation device, an observation method, and a computer-readable medium developed to allow checking of observation data in entirety. An observation device comprises: a data acquisition unit that acquires observation data together with temporal information, the observation data including at least one of an internal behavior signal about a numerical controller for controlling a machine tool, etc., and feed axis control data and spindle control data detected from a motor of the machine tool, etc.; a setting unit that sets a time scale for the observation data acquired by the data acquisition unit; a print data generation unit that generates print data including the observation data represented on the time scale set by the setting unit; and a print data output unit that outputs the print data generated by the print data generation unit to a printer capable of producing a long printed matter.

8 Claims, 10 Drawing Sheets

(56) References Cited

U.S. PATENT DOCUMENTS

| | | | |
|---|---|---|---|
| 7,292,245 B2 * | 11/2007 | Goggin | G06T 11/206 345/440 |
| 7,348,981 B1 * | 3/2008 | Buck | G06Q 30/06 345/440 |
| 7,629,975 B2 * | 12/2009 | Buck | G06Q 40/04 345/440 |
| 7,965,292 B2 * | 6/2011 | Buck | G06Q 40/04 345/440 |
| 8,044,959 B2 * | 10/2011 | Buck | G06Q 40/04 345/440 |
| 8,269,774 B2 * | 9/2012 | Buck | G06F 3/04845 345/440.2 |
| 8,537,161 B2 * | 9/2013 | Buck | G06F 3/04817 345/440.2 |
| 8,970,594 B2 * | 3/2015 | Nihlwing | G05B 23/0272 345/440 |
| 9,189,874 B2 * | 11/2015 | Buck | G06F 3/04817 |
| 9,542,709 B2 * | 1/2017 | Buck | G06Q 30/06 |
| 9,852,530 B2 * | 12/2017 | Buck | G06T 3/40 |
| 10,037,574 B2 * | 7/2018 | Decker | G06Q 40/04 |
| 10,062,189 B2 * | 8/2018 | Buck | G06Q 30/06 |
| 2010/0188406 A1 | 7/2010 | Kincaid | |

FOREIGN PATENT DOCUMENTS

| | | |
|---|---|---|
| JP | 5-133980 | 5/1993 |
| JP | 7-83706 | 3/1995 |
| JP | 11-242056 | 9/1999 |
| JP | 2002-311059 | 10/2002 |
| JP | 2003-222643 | 8/2003 |
| JP | 2007-327744 | 12/2007 |
| JP | 2013-25776 | 2/2013 |
| JP | 2014-151551 | 8/2014 |
| JP | 2014-164597 | 9/2014 |
| JP | 2017-16355 | 1/2017 |

OTHER PUBLICATIONS

Office Action dated Nov. 16, 2020 in CN Patent Application No. CN201811518179.4.

* cited by examiner

OBSERVATION DEVICE, OBSERVATION METHOD, AND NON-TRANSITORY COMPUTER-READABLE MEDIUM STORING AN OBSERVATION PROGRAM

BACKGROUND OF THE INVENTION

This application is based on and claims the benefit of priority from Japanese Patent. Application No. 2017-239947, filed on 14 Dec. 2017, the content of which is incorporated herein by reference.

Field of the Invention

The present invention relates to a device, a method, and a non-transitory computer-readable medium storing for observing the running state of industrial machines (hereinafter also called "machines") including machine tools and industrial robots.

Related Art

The running state of a machine tool has conventionally been grasped, generally by displaying observation data on a display device of a measuring unit, etc., as a time-series waveform, for example. The observation data includes an internal behavior signal about a numerical controller (hereinafter also called "NC") for controlling an industrial machine, feed axis control data detected from a motor, etc. A display area on the measuring unit is limited. Hence, if observation data about one machining is displayed in entirety, for example, it becomes difficult to check a dense section of a waveform of the observation data in detail. In this regard, a technique of enlarging a waveform and displaying the enlarged waveform by changing a display time axis has been disclosed, for example (see Patent Documents 1 and 2, for example).

Patent Document 1: Japanese Unexamined Patent. Application, Publication No. 2017-16355

Patent Document 2: Japanese Unexamined Patent Application, Publication No. H11-242056

SUMMARY OF THE INVENTION

As described above, a display area on the measuring unit, etc. is limited. Hence, for display on the measuring unit, etc., a waveform of observation data about a designated partial time period can be checked by displaying the waveform in an enlarged manner. However, observation data about one machining cannot be viewed at a glance to such a level that a waveform of the observation data in all time periods can be checked in detail, for example.

The present invention is intended to provide an observation device, an observation method, and a non-transitory computer-readable medium storing an observation program developed to allow checking of observation data in entirety.

(1) An observation device according to the present invention ("observation device 1" described later, for example) comprises: a data acquisition unit. ("data acquisition unit 11" described later, or example) that acquires observation data together with temporal information, the observation data including at least one of an internal behavior signal about a numerical controller ("numerical controller 5" described later, for example) for controlling a machine tool or an industrial machine ("machine tool 4" described later, for example), and feed axis control data and spindle control data detected from a motor of the machine tool or the industrial machine; a setting unit ("setting unit 12" described later, for example) that sets a time scale for the observation data acquired by the data acquisition unit; a print data generation unit ("print data generation unit 13" described later, for example) that generates print data including the observation data represented on the time scale set by the setting unit; and an output unit ("print data output unit 14" described later, for example) that outputs the print data generated by the print data generation unit to a printing device ("printer 6" described later, for example) capable of producing a long printed matter.

(2) In the observation device described in (1), the observation data may be waveform data, and the setting unit may set the time scale based on the value of the amplitude of the observation data, and the time scale may be set to be enlarged further with increase in the value of the amplitude of the observation data.

(3) In the observation device described in (1) or (2), the observation data may be waveform data, and the setting unit may set the time scale based on the value of the frequency of the observation data, and the time scale may be set to be enlarged further with increase in the value of the frequency of the observation data.

(4) In the observation device described in (2) or (3), the setting unit may set the time scale for each of sections of a time period resulting from division of the time period in which the observation data has been acquired.

(5) In the observation device described in (4), if the size of the time scale differs between the sections of the time period resulting from division of the time period in which the observation data has been acquired, the print data generation unit may generate the print data having a print attribute responsive to the sections of the time period.

(6) In the observation device described in (2) or (3), the setting unit may set the time scale so as to enlarge the time scale in response to respective maximums of the amplitude and the frequency of the observation data, or a maximum of the amplitude or the frequency of the observation data.

(7) An observation method implemented using a computer according to the present invention comprises the following steps performed by the computer ("observation device 1" described later, for example): a step of acquiring observation data together with temporal information, the observation data including at least, one of an internal behavior signal about a numerical controller ("numerical controller 5" described later, for example) for controlling a machine tool or an industrial machine ("machine tool 4" described later, for example), and feed axis control data and spindle control data detected from a motor of the machine tool or the industrial machine; a step of setting a time scale for the acquired observation data; a step of generating print data represented on the set time scale; and a step of outputting the generated print data to a printing device ("printer 6" described later, for example) capable of producing a long printed matter.

(8) A non-transitory computer-readable medium storing an observation program according to the present invention causes a computer ("observation device 1" described later, for example) to function as: data acquisition means that acquires observation data together with temporal information, the observation data including at least one of an internal behavior signal about a numerical controller ("numerical controller 5" described later, for example) for controlling a machine tool or an industrial machine ("machine tool 4" described later, for example), and feed axis control data and spindle control data detected from a motor of the machine tool or the industrial machine; setting means that sets a time scale for the observation data acquired by the data acquisition means; print data generation means that generates print data including the observation data represented on the time scale set by the setting means; and output means that outputs the print data generated by the print data generation means to a printing device ("printer 6" described later, for example) capable of producing a long printed matter.

The present invention can provide an observation device, an observation method, and a non-transitory computer-readable medium storing an observation program developed to allow checking of observation data in entirety.

DETAILED DESCRIPTION OF THE INVENTION

Embodiment

Figure 1:
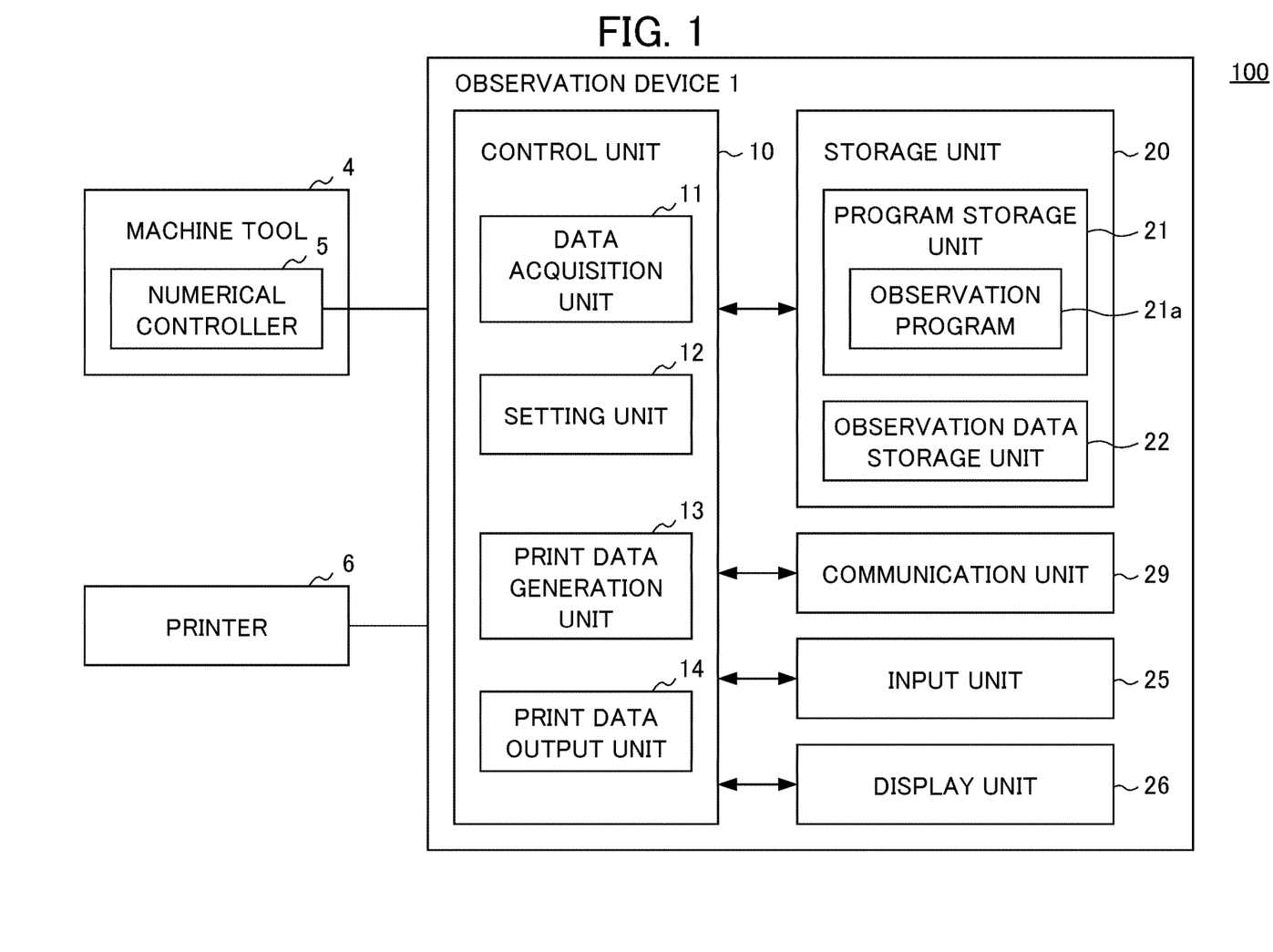
FIG. 1 shows the entire configuration of an observation system and the functional configuration of an observation device according to an embodiment.

An example of an embodiment of the present invention will be described below. FIG. 1 shows the entire configuration of an observation system 100 and the functional configuration of an observation device 1 according to this embodiment. The observation system 100 is a system in which the observation device 1 acquires observation data output from a numerical controller 5 for a machine tool generates print data so as to allow grasping of the observation data in entirety, and outputs the generated print data to a printer 6.

The observation device 1 is an information processor (computer) that processes observation data about the machine tool 4 as an example of a machine to be observed, and outputs information. The observation device 1 may be incorporated into the numerical controller 5 that controls driving units such as a servo motor and a linear motor constituting the machine tool 4. The machine to be observed is not united to the machine tool 4.

The observation device 1 includes a control unit 10, a storage unit 20, an input unit 25, a display unit 26, and a communication unit 29. The control unit 10 may be a central processing unit (CPU). The control unit 10 executes various types of programs for controlling the observation device 1 stored in the storage unit 20, thereby controlling the observation device 1 in a centralized manner. The control unit 10 includes a data acquisition unit 11, a setting unit 12, print data generation unit 13, and a print data output unit 14. These functional units are realized by execution of a program (observation program 21*a*) stored in the storage unit 20 by the control unit 10.

The data acquisition unit 11 acquires observation data about an actual running state of the machine tool 4 in a predetermined sampling cycle together with temporal information, and stores the acquired observation data into the storage unit 20. For example, the observation data includes an internal behavior signal about the numerical controller 5 acquired in time-series order in the predetermined sampling cycle (1 msec, for example), and feed axis control data and spindle control data about a spindle detected from a motor (not shown) of the machine tool 4, for example. The observation data is data about one machining, for example. The data acquisition unit 11 can acquire the observation data in response to implementation of one machining.

For example, the internal behavior signal about the numerical controller 5 includes G-code corresponding to a command for the motion of a table or a tool, M-code corresponding to a command for the rotation of a spindle or auxiliary motion such as charging or not charging cutting oil, and a machining state signal indicating a state such as a waiting state under in-position check for positioning. The internal behavior signal about the numerical controller 5 is execution state data including an execution position and a particular parameter value in a machining program for the machine tool 4. The execution state data in the machining program acquired by the observation device 1 may include a sequence number, etc. for identifying a block in the machining program as the execution position, for example.

The feed axis control data includes position coordinates, a torque value, a speed, a current value, or a voltage value, for example. The spindle control data includes a rotation speed, a torque value, a current value, or a voltage value, for example. The observation data may be a signal transmitted between external equipment and the numerical controller 5. For example, a sequence signal for executing sequence control over the machine tool 4 may be used as the observation data. Further, the observation data may be information given from various types of sensors such as a temperature sensor and an acceleration sensor.

The setting unit 12 sets a time scale for the observation data. For example, the setting unit 12 may set a time scale based on the value of the amplitude of the observation data, and the time scale may be set to be enlarged further with increase in the value of the amplitude of the observation data. For example, the setting unit 12 may set a time scale based on the value of the frequency of the observation data, and the time scale may be set to be enlarged further with increase in the value of the frequency of the observation data. Further, the setting unit 12 may set a time scale for each of sections of a time period resulting from division of the time period in which the observation data has been acquired. Still further, the setting unit 12 may set a time scale so as to enlarge the time scale in response to respective maximums of the amplitude and the frequency of the observation data, or a maximum of the amplitude or the frequency of the observation data.

The print data generation unit 13 reads the observation data from the storage unit 20, and generates print data represented on the time scale set by the setting unit 12. The print data is image data generated by rearranging data on the set time scale. If the size of a time scale differs between sections of a time period resulting from division of the time period in which the observation data has been acquired, the print data generation unit 13 may generate print data having a print attribute responsive to the sections of the time period. The print attribute is an attribute about a line such as color, type, or width, or an attribute about a background such as a background color or a background pattern in a relevant time period. The print data output unit 14 outputs the print data generated by the print data generation unit 13 to the printer 6.

Figure 2:
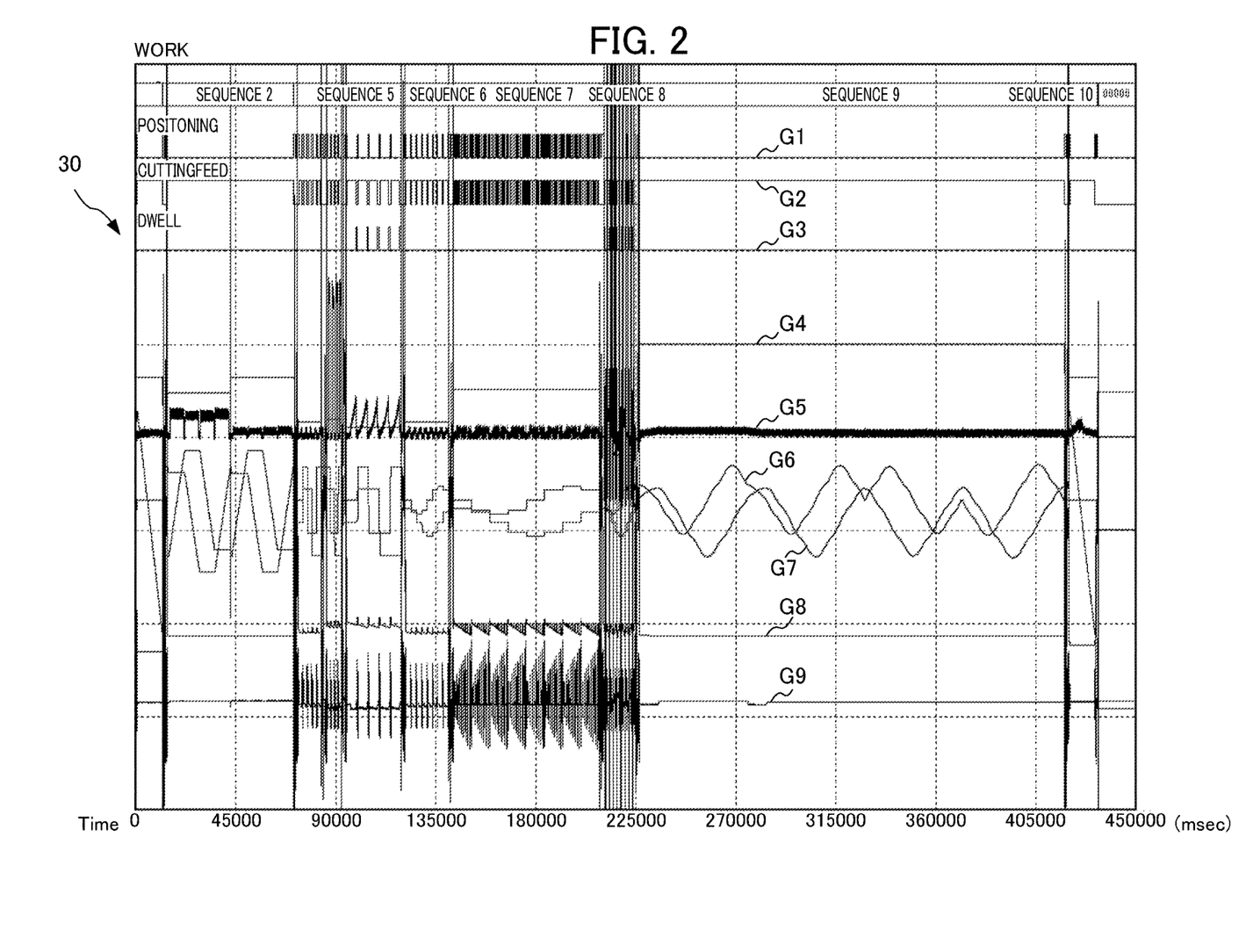
FIG. 2 shows an example of a data graph displayed on a display unit according to this embodiment.

FIG. 2 shows an example of a data graph 30 displayed on the display unit 26 according to this embodiment. In this example, the data graph 30 includes nine pieces of observation data from a graph G1 to a graph G9 displayed as waveform graphs. The graphs shown in this example cover a period of time from the start to the finish of one machining. This period of time is 450000 msec. In this example, the graphs G1 to G3 correspond to time-series data showing signals about the behavior of an NC, the graphs G4 and G5 correspond to time-series data showing spindle control data, and the graphs G6 to G9 correspond to time-series data showing servo control data.

Referring back to FIG. 1, the storage unit 20 stores a program, etc. to be executed by the control unit 10. The storage unit 20 includes a program storage unit 21 and an observation data storage unit 22. The program storage unit 21 stores the observation program 21$a$, etc. to be executed by the control unit 10. The observation data storage unit 22 is a storage region in which observation data acquired by the data acquisition unit 11 is stored. The input unit 25 is an input device including a keyboard and a mouse, for example. The display unit 26 corresponds to a measuring unit. For example, the display unit 26 is a display device such as a liquid crystal display (LCD). The communication unit 29 is a communication control device for transmission and receipt of data to and from external equipment (such as the machine tool 4, numerical controller 5, printer 6, for example) through a communication network.

The machine tool 4 includes a cutting machine, a laser machine, and an electrical discharge machine, for example. The machine tool 4 performs processing such as machining under control by the numerical controller 5. The numerical controller 5 is a device that controls the machine tool 4 to cause the machine tool 4 to make a predetermined motion. The printer 6 is a printing device capable of producing a long printed matter. Placing a roll of paper at the printer 6 causes the printer 6 to output print data onto the roll of paper.

Figure 3:
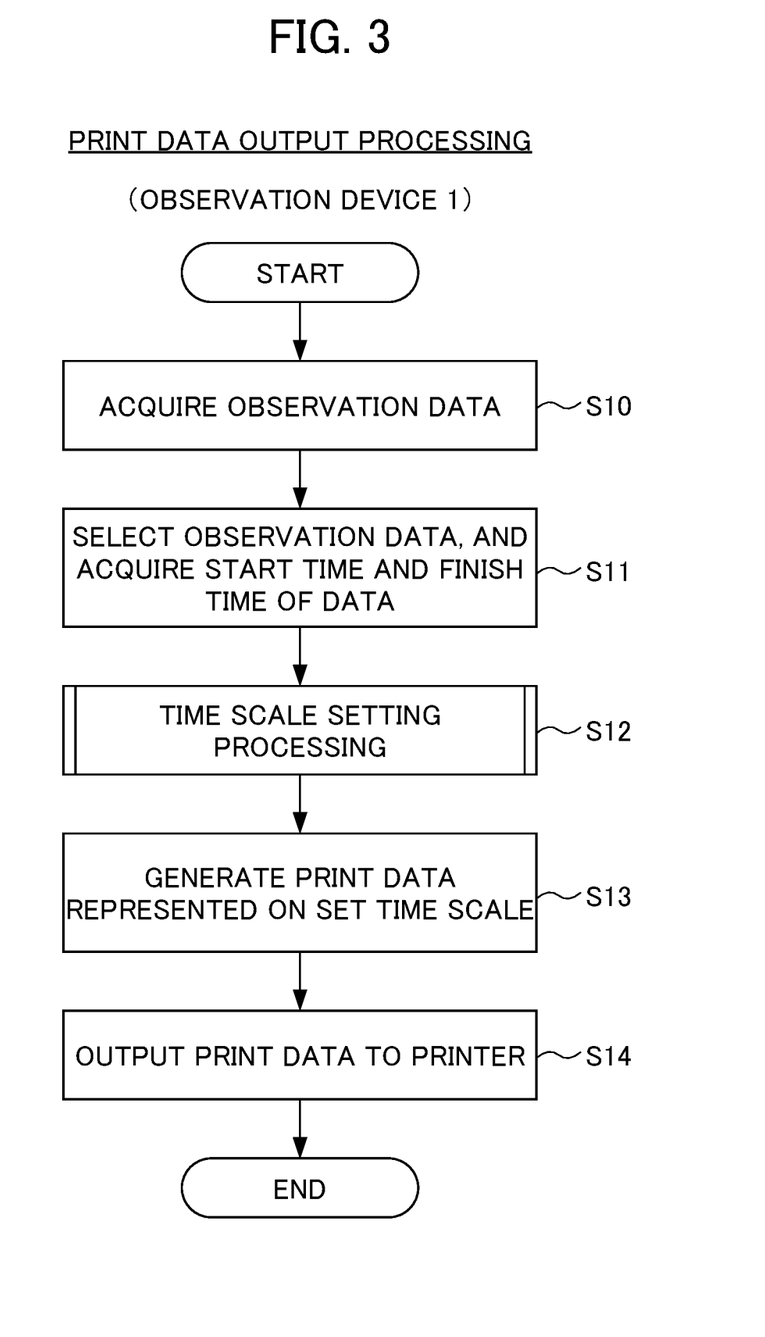
FIG. 3 is a flowchart showing print data output processing performed by the observation device according to this embodiment.

Processing performed by the observation device 1 will be described next by referring to FIG. 3. FIG. 3 is a flowchart showing print data output processing performed by the observation device 1 according to this embodiment. In step S10 (in the below, "step S" will simply be called "S"), the control unit 10 (data acquisition unit 11) of the observation device 1 acquires observation data together with temporal information. The observation data includes at least one of an internal behavior signal about the numerical controller 5 for controlling the machine tool 4, and feed axis control data and spindle control data detected from the motor of the machine tool 4. The data acquisition unit 11 stores the acquired observation data into the observation data storage unit 22.

In S11, the control unit 10 selects observation data to be output as print data from the observation data acquired by the data acquisition unit 11, and determines the selected observation data to be a processing target. Then, the control unit 10 acquires a start time and a finish time of the selected observation data. For example, the control unit 10 may select observation data by outputting the observation data stored the observation data storage unit 22 to the display unit 26, and letting a user select data. In this case, multiple pieces of time-series data constituting the observation data may be selectable, and the user may select one piece of time-series data as observation data, for example.

Figure 4:
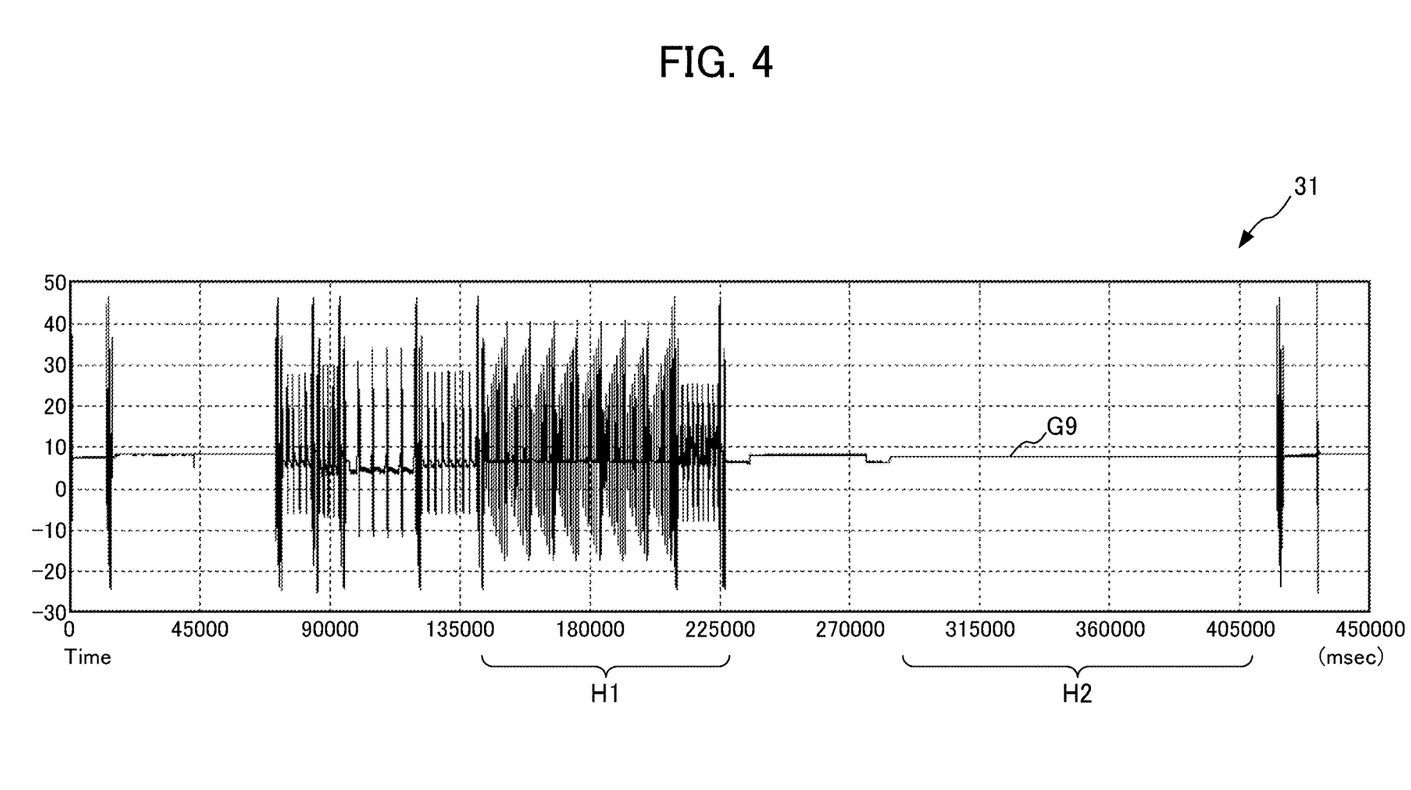
FIG. 4 shows an example of a data graph showing one piece of observation data shown in FIG. 2.

A specific example will be described below on the assumption that one piece of time-series data is used as observation data. FIG. 4 shows a data graph showing only the graph G9 about a Z-axis position in the feed axis control data as one piece of time-series data constituting the observation data in FIG. 2. The data graph 31 in FIG. 4 shows a part of the graph G9. The graph G9 includes a section H1 in which a waveform is dense, and a section H2 in which the waveform is sparse. A state in the section H2 can be grasped without the need of enlargement in a time axis direction. By contrast, a state in the section H1 cannot be grasped in detail unless the waveform is enlarged in the time axis direction.

In S12 of FIG. 3, the control unit 10 (setting unit 12) performs time scale setting processing. The time scale setting processing will be described in detail later. In S13, the control unit 10 (print data generation unit 13) generates print data represented on the set time scale. The generated print data is image data including a scale mark. In S14, the control unit 10 (print data output unit 14) outputs the generated print data to the printer 6. Then, the control unit 10 finishes the print data output processing. As a result of the process in S14, the printer 6 prints the print data on a roll of paper. Thus, the observation data in all time periods can be grasped by giving a glance to the printed content on the roll of paper.

Figure 5:
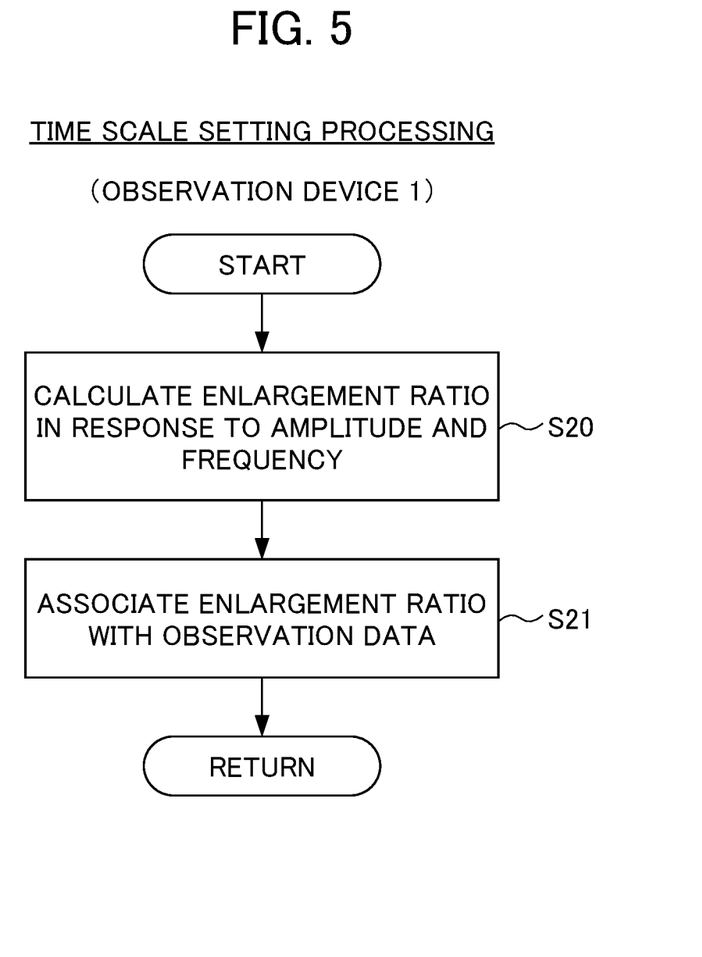
FIG. 5 is a flowchart showing time scale setting processing performed by the observation device according to this embodiment.
Figure 6A:
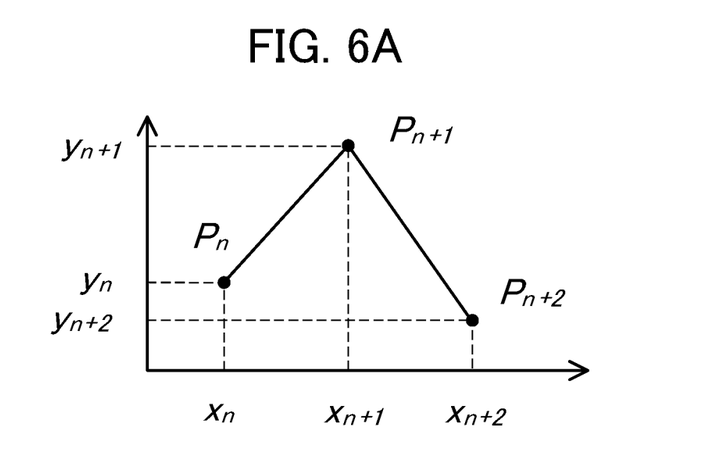
FIG. 6A is a diagram used to explain the time scale setting processing performed by the observation device according to this embodiment.
Figure 6B:
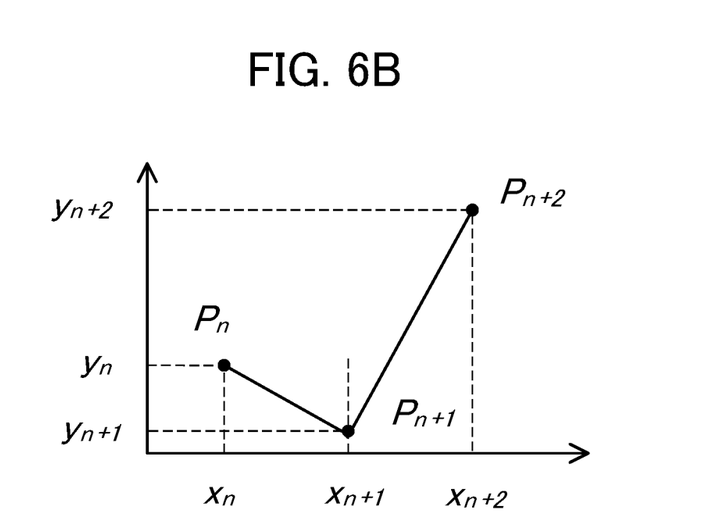
FIG. 6B is a diagram used to explain the time scale setting processing performed by the observation device according to this embodiment.
Figure 7A:
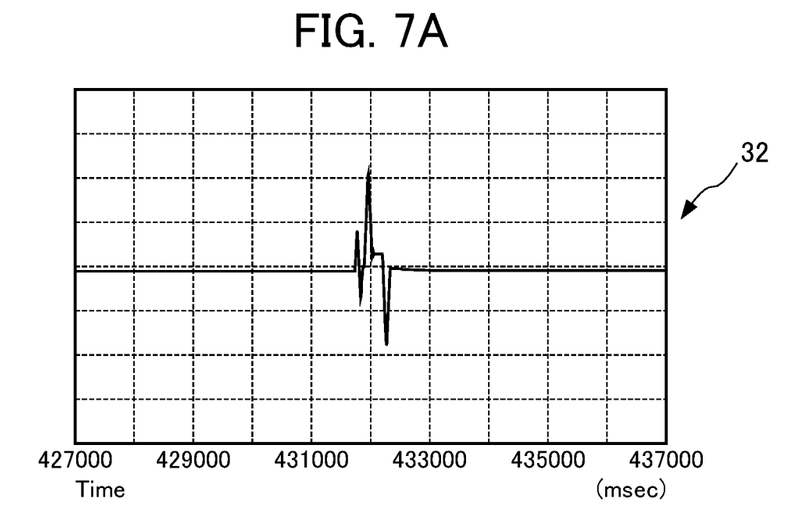
FIG. 7A is an example of processing using a time scale set through the time scale setting processing performed by the observation device according to this embodiment.
Figure 7B:
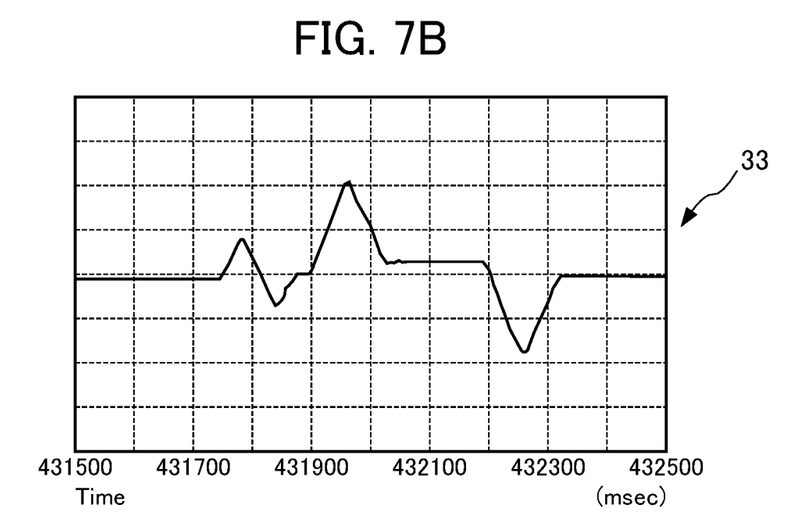
FIG. 7B is an example of processing using a time scale set through the time scale setting processing performed by the observation device according to this embodiment.

The time scale setting processing will be described next. FIG. 5 is a flowchart showing the time scale setting processing performed by the observation device 1 according to this embodiment. FIGS. 6A and 6B are diagrams used to explain the time scale setting processing performed by the observation device 1 according to this embodiment. FIGS. 7A and 7B are examples of processing using respective time scales set through the time scale setting processing performed by the observation device 1 according to this embodiment. In S20 of FIG. 5, the setting unit 12 calculates an enlargement ratio in response to an amplitude and a frequency. A specific example of a method of calculating the enlargement ratio in response to an amplitude and a frequency will be described below.

First, the setting unit 12 selects three points $P_n$, $P_{n+1}$, and $P_{n+2}$ arbitrarily on the waveform of the observation data so as to satisfy the following mathematical expression. Here, P is represented as coordinate data (x, y). Further, $P_{n+1}$ means a point at the peak of each waveform and its neighboring point. Assuming that a unit of time corresponding to one scale in an direction (time axis) for printing is t, $P_n$ means a point on the waveform at a point in time earlier than $P_{n+1}$ by the time t, and $P_{n+2}$ means a point on the waveform at a point in time after $P_{n+1}$ by the time t.

$$dx = x_{n+1} - x_n = x_{n+2} - x_{n+1} > 0 \quad (1)$$

The coordinate data (x, y) in each of FIGS. 6A and 6B shows a waveform at a given time represented as coordinate values for forming an image. The three points $P_n$, $P_{n+1}$, and $P_{n+2}$ are points satisfying the foregoing mathematical expression (1).

Next, $k_n$ and $k_{n+1}$ are defined as follows:

$$k_n = \frac{y_{n+1} - y_n}{dx} \quad (2\text{-}1)$$

$$k_{n+1} = \frac{y_{n+2} - y_{n+1}}{dx} \quad (2\text{-}2)$$

Then, dx is adjusted so as to satisfy the following mathematical expression:

$$k_n \times k_{n+1} < 0 \text{ then } |k_n| + |k_{n+1}| < k_s$$

(In this expression, $k_s$ is a positive constant prescribed by an operator.) . . . (3)

Regarding the three arbitrary points $P_n$, $P_{n+1}$, and $P_{n+2}$ on the waveform in each of FIGS. 6A and 6B, $P_{n+1}$ is a peak point, so that the mathematical expression (3) is used for adjusting dx. The setting unit 12 can use a maximum of dx, calculated by applying the mathematical expressions (1) to (3) to the waveform of the observation data in all time periods, as a part of time corresponding to one scale in the x direction (time axis) for printing. Specifically, a unit of time corresponding to one scale is the x direction (time axis) for printing is a maximum dx. Thus, the setting unit 12 determines an enlargement ratio by calculating a maximum of dx with respect to the initial unit of time t of one scale.

In S21, the setting unit 12 associates the calculated enlargement ratio with the observation data. Then, the control unit 10 finishes the time scale setting processing, and shifts the flow to step S13 in the flowchart (FIG. 3) showing the print data output processing performed by the observation device 1. For example, a data graph 32 about the observation data shown in FIG. 7A is enlarged at the enlargement ratio calculated through the foregoing processing to become a data graph 33 about the observation data shown in FIG. 7B. Comparison between the data graph 32 and the data graph 33 shows that a dense section in the data graph 32 is enlarged in the time axis direction in the data graph 33, so that the dense section is resolved and becomes more visible. In this way, the observation device 1 automatically adjusts a time scale in such a manner that a dense section in a graph from which it is hard to check details becomes a section that facilitates the checking of the details. By doing so, the observation device 1 allows for the checking of observation data without requiring work such as particular operation by a user, for example.

Figure 8:
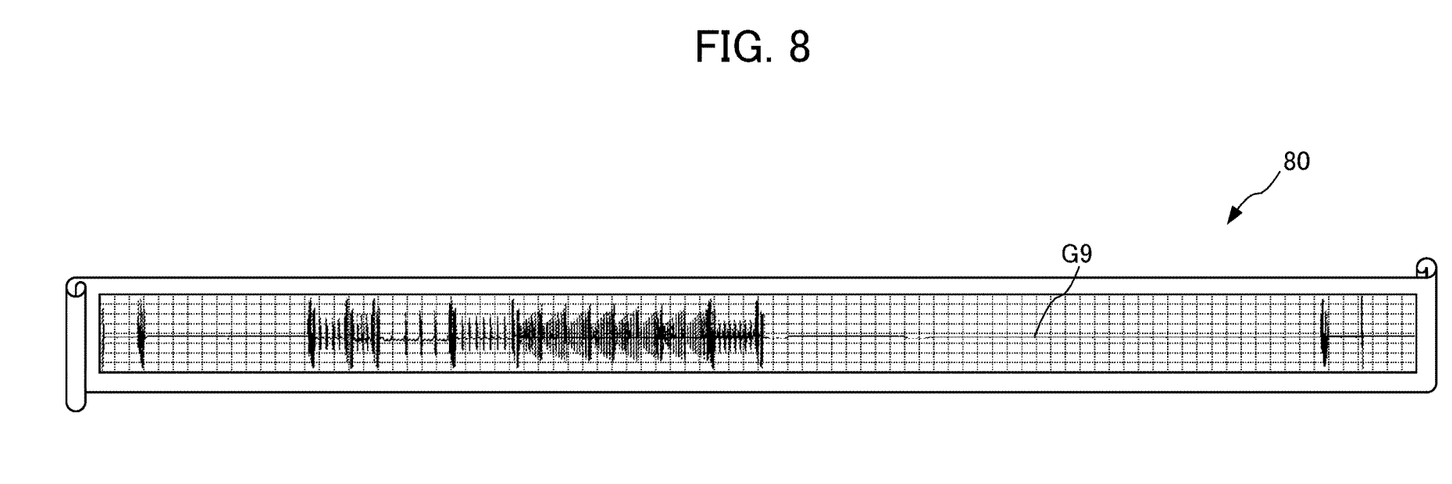
FIG. 8 shows an example of a printed matter according to this embodiment.

FIG. 8 shows a printed matter 80 produced by the printer 6 and containing print data generated by fitting the observation data shown in FIG. 4 to the foregoing mathematical expressions and enlarging the observation data uniformly in the time axis direction. As described above, the printed matter 80 is produced by printing image data generated by redrawing the observation data shown in FIG. 4 in the time axis direction, specifically, in the horizontal direction. While not shown in FIG. 8, the image data includes temporal information in the time axis. Thus, the observation data can be checked in entirety by giving a glance at the printed matter 80.

Observation actually acquired from the numerical controller 5 is data in a period from several tens of seconds to several minutes. If the observation data is enlarged in the time axis direction through the foregoing processing and resultant print data is printed, a printed matter of the print data becomes as long as several meters. Thus, placing a roll of paper at the printer 6 and then operating the printer 6 causes the printer 6 to produce the printed matter 80 having a length of several meters. This allows a user to grasp and analyze a running state while viewing a waveform on the printed matter 80.

As described above, the observation device 1 of this embodiment achieves the following effect. The observation device 1 generates print data including observation data about the running state of the machine tool 4 represented on a time scale set in response to respective maximums of the amplitude and the frequency of the observation data, or a maximum of the amplitude or the frequency of the observation data, and outputs the generated print data to the printer 6. In this way, the observation device 1 sets the entirety of the observation data on an easily visible time scale. This allows a user to check the observation data in entirety while viewing the printed matter 80 produced by printing the print data. As a result, the running state of the machine tool 4 can be grasped using the printed matter 80.

The observation device 1 sets a time scale based on the value of the amplitude of observation data. The time scale is set to be enlarged further with increase in the value of the amplitude of the observation data. Further, the observation device 1 sets a time scale based on the value of the frequency of observation data. The time scale is set to be enlarged further with increase in the value of the frequency of the observation data. Thus, the observation data can become easily visible for a user by being enlarged in response to a section in which an amplitude or a frequency is high.

The present invention is not limited to the above-described embodiment. The effects described in the embodiment are merely a list of the most preferred effects resulting from the present invention. Effects achieved by the present invention are not limited to those described in the embodiment.

In this embodiment, an enlargement ratio responsive to an amplitude and a frequency is described as being calculated using the mathematical expressions. However, this does not limit calculation of an enlargement ratio. An enlargement ratio may be calculated in response to an amplitude or a frequency. Further, the foregoing mathematical expressions are merely presented as examples. An enlargement ratio may be calculated by a different method.

In the example described in this embodiment, one piece of time-series data constituting observation data is used for generating print data. However, this does not limit generation of print data. Print data to be generated and output may include all pieces of time-series data. In this case, all the pieces of time-series data can be presented in an easily visible manner by calculating respective enlargement ratios for all these pieces of time-series data, and generating print data using the largest of these enlargement ratios.

A machine to be observed by the observation device 1 of this embodiment is not limited to the machine tool 4. This embodiment is further applicable to industrial machines including industrial robots.

An observation method implemented by the observation device 1 is realized by software. To realize the observation method by software, programs constituting the software are installed on a computer. These programs may be stored in a removable medium and then distributed to a user. Alternatively, these programs may be distributed by being downloaded onto a computer of the user through a network.

(Modification)

Figure 9:
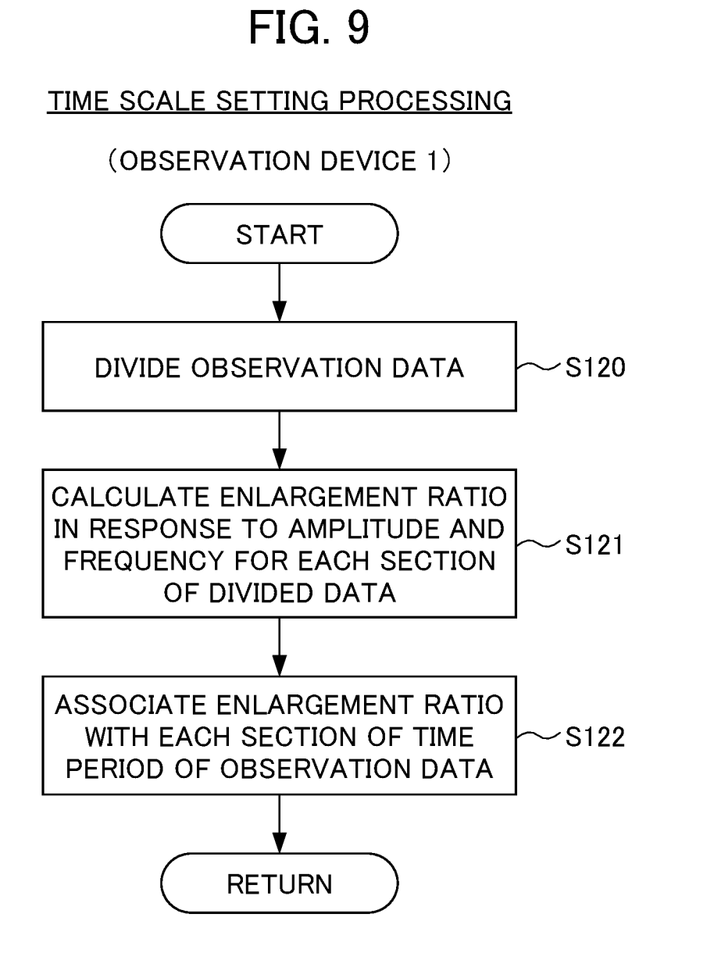
FIG. 9 is a flowchart showing time scale setting processing performed by an observation device according to a modified embodiment.
Figure 10:
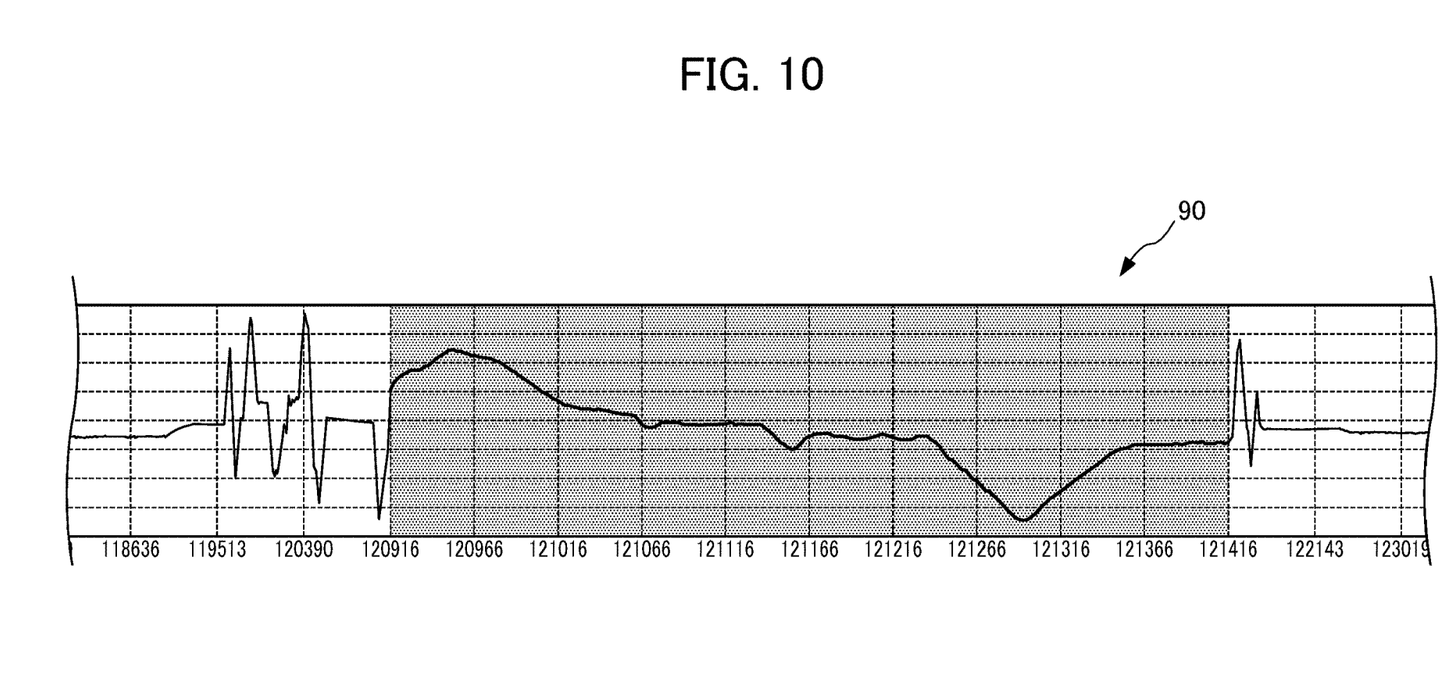
FIG. 10 shows an example of a printed matter according to the modified embodiment.

In the example given in the foregoing description, the observation device 1 generates print data by enlarging observation data uniformly in the time axis direction. Alternatively, the observation device 1 may generate print data by dividing a time period, and enlarging the observation data in response to a degree of density of waveform data in each section of the time period. FIG. 9 is a flowchart showing time scale setting processing performed by the observation device 1 according to a modified embodiment. FIG. 10 shows an example of a printed matter according to the modified embodiment. The setting unit 12 of the observation device 1 performs the time scale setting processing shown in FIG. 9 instead of the processing in FIG. 5.

In S120 of FIG. 9, the setting unit 12 divides observation data into sections of a time period. The setting unit 12 may divide the time period at predetermined intervals. Further, the setting unit 12 may determine a time period to be divided by analyzing a waveform of the observation data. In S121, the setting unit 12 calculates an enlargement ratio in response to an amplitude and a frequency for each of the sections of the divided time period. The enlargement ratio may be calculated by the same method as that described above. The calculation method, which has been applied to the entirety of a waveform of the observation data, may be applied to a waveform in each of the sections of the divided time period. In S122, the setting unit 12 associates the calculated enlargement ratio with each of the sections of the time period of the observation data. Next, the control unit 10 finishes the time scale setting processing, and shifts the flow to step S13 in the flowchart (FIG. 3) showing the print data output processing performed by the observation device 1.

In S13 of FIG. 3, the control unit 10 (print data generation unit 13) generates print data represented on a set time scale. For this generation, if an enlargement ratio differs between the sections of the time period, a print attribute may be changed in response to the enlargement ratios. FIG. 10 shows a part of a data graph 90 generated by employing the enlargement ratio based on the time scale set by conducting the time scale setting processing shown in FIG. 9. The data graph 90 is a part of an entire data graph extracted for the purpose of description. In the data graph 90, to make sections with different enlargement ratios easily visible, the line of a graph with a high enlargement ratio is shown in bold and a background is colored for this graph. In the data graph 90, further, time corresponding to a time axis is drawn in response to the enlargement ratios.

As described above, the observation device 1 sets a time scale for each of sections of a time period resulting from division of the time period in which observation data has been acquired. If the size of a time scale differs between sections of a time period resulting from division of the time period in which the observation data has been acquired, the observation device 1 generates print data having a print attribute responsive to the sections of the time period. In this way, the print data is generated by changing an enlargement ratio between the sections of the time period. Thus, in the generated print data, a high enlargement ratio is employed for a dense section of a graph, and a low enlargement ratio is employed for a sparse section of the graph. By doing so, the observation data to be printed can be represented on a time scale that differs between the sections of the time period. This allows the observation data to be viewed in entirety at a glance, while allowing all the sections to be presented in an easily visible manner. Additionally, a low enlargement ratio is employed for a section of a graph with little change, whereas a high enlargement ratio is employed for a section of the graph with large change. This makes it possible to reduce the length of paper to be printed, compared to a graph enlarged in entirety at a uniform enlargement ratio. Further, in response to different time scales, the thickness of the line of a graph or a background color is changed. This allows a user to easily understand the presence of the different time scales.

In the example given in the foregoing description, in response to different time scales, the thickness of the line of a graph or a background color is changed. However, this is not the only way to show the different time scales. A print attribute to be changed may be the type or color of the line of a graph, a background pattern, or the type or color of the line of a scale mark, for example. Changing such different print attributes also allows a user to easily recognize the presence of the different time scales.

EXPLANATION OF REFERENCE NUMERALS

1 Observation device
4 Machine tool
5 Numerical controller
6 Printer
10 Control unit.
11 Data acquisition unit
12 Setting unit
13 Print data generation unit
14 Print data output unit
20 Storage unit
21a Observation program
22 Observation data storage unit
100 Observation system

What is claimed is:

1. An observation device comprising:
   a data acquisition unit that acquires observation data together with temporal information, the observation data being waveform data including at least one of an internal behavior signal about a numerical controller for controlling a machine tool or an industrial machine, and feed axis control data and spindle control data detected from a motor of the machine tool or the industrial machine;
   a setting unit that automatically sets a scale in a time axis direction in drawing a graph having a time axis covering a period of time from start to finish of one machining based on a value of an amplitude and/or frequency of the observation data acquired by the data acquisition unit to enlarge a dense section in the observation data;
   a print data generation unit that generates print data including the observation data represented on the scale in the time axis direction set by the setting unit; and
   an output unit that outputs the print data generated by the print data generation unit to a printing device capable of producing a long printed matter, in which the time axis is printed in a feed direction of a roll of paper,
   wherein the setting unit automatically sets the scale in the time axis direction to obviate a particular operation by a user, and
   wherein the setting unit automatically sets the scale in the time axis direction for sections of the period of time resulting from a division of the period of time in which the observation data has been acquired.

2. The observation device according to claim 1, wherein when the setting unit automatically sets the scale in the time axis direction based on the value of the amplitude of the observation data, the setting unit automatically sets the scale in the time axis direction with an increase in the value of the amplitude of the observation data.

3. The observation device according to claim 1, wherein when the setting unit automatically sets the scale in the time axis direction based on the value of the frequency of the observation data, the setting unit automatically sets the scale in the time axis direction with an increase in the value of the frequency of the observation data.

4. The observation device according to claim 1, wherein the setting unit determines the sections of the period of time by analyzing a waveform of the observation data, and automatically sets the scale in the time axis direction for each of the sections of the period of time.

5. The observation device according to claim 1, wherein when the size of the scale in the time axis direction differs between the sections of the period of time resulting from the division of the period of time in which the observation data has been acquired, the print data generation unit generates the print data having a print attribute being different depending on the size of the scale in the time axis direction for each of the sections of the period of time.

6. The observation device according to claim 1, wherein the setting unit automatically sets the scale in the time axis direction so as to enlarge the time scale in response to respective maximums of the value of the amplitude and the value of the frequency of the observation data, or a maximum of the value of the amplitude or the value of the frequency of the observation data.

7. An observation method implemented using a computer, the method comprising the following steps performed by the computer:
   a step of acquiring observation data together with temporal information, the observation data being waveform data including at least one of an internal behavior signal about a numerical controller for controlling a machine tool or an industrial machine, and feed axis control data and spindle control data detected from a motor of the machine tool or the industrial machine;
   a step of automatically setting a scale in a time axis direction in drawing a graph having a time axis covering a period of time from start to finish of one machining based on a value of an amplitude and/or frequency of the observation data to enlarge a dense section in the observation data;
   a step of generating print data representing the observation data on the scale in the time axis direction; and
   a step of outputting the print data to a printing device capable of producing a long printed matter, in which the time axis is printed in a feed direction of a roll of paper,
   wherein the step of automatically setting the scale in the time axis direction obviates a particular operation by a user, and
   wherein the step of automatically setting the scale in the time axis direction automatically sets the scale for sections of the period of time resulting from a division of the period of time in which the observation data has been acquired.

8. A non-transitory computer-readable storage medium storing an observation program that causes a processor to execute:
   acquiring observation data together with temporal information, the observation data being waveform data including at least one of an internal behavior signal about a numerical controller for controlling a machine tool or an industrial machine, and feed axis control data and spindle control data detected from a motor of the machine tool or the industrial machine;
   automatically setting a scale in a time axis direction in drawing a graph having a time axis covering a period of time from start to finish of one machining based on a value of an amplitude and/or frequency of the observation data to enlarge a dense section in the observation data;
   generating print data including the observation data represented on the scale set in the time axis direction; and
   outputting the print data to a printing device capable of producing a long printed matter, in which the time axis is printed in a feed direction of a roll of paper,
   wherein automatically setting the scale in the time axis direction obviates a particular operation by a user, and
   wherein automatically setting the scale in the time axis direction automatically sets the scale for sections of the period of time resulting from a division of the period of time in which the observation data has been acquired.

* * * * *